United States Patent [19]

Langer et al.

[11] 3,993,836

[45] Nov. 23, 1976

[54] BONDING OF RUBBER TO REINFORCING ELEMENTS

[75] Inventors: Heimo J. Langer, Columbus, Ohio; William J. McKillip, Crystal Lake, Ill.

[73] Assignee: Ashland Oil, Inc., Ashland, Ky.

[22] Filed: Mar. 26, 1975

[21] Appl. No.: 562,261

[52] U.S. Cl. ............................ 428/383; 156/110 A; 156/331; 428/295; 428/395; 260/836
[51] Int. Cl.² .................... B32B 15/02; B32B 15/08
[58] Field of Search ........... 428/295, 383, 395, 379, 428/381; 156/110 A, 331; 260/80.3 R, 80.3 N, 29.3, 844; 526/292, 307

[56] References Cited
UNITED STATES PATENTS

| | | | |
|---|---|---|---|
| 2,862,281 | 12/1958 | Klausner | 156/110 A |
| 3,226,276 | 12/1965 | Rye et al. | 156/110 A |
| 3,485,806 | 12/1969 | Bloomquist et al. | 260/80.3 N |
| 3,628,992 | 12/1971 | McKillip et al. | 428/379 |
| 3,642,553 | 2/1972 | Georges | 156/110 A |
| 3,664,990 | 5/1972 | Slagel | 260/80.3 N |
| 3,715,343 | 2/1973 | Slagel et al. | 260/80.3 N |
| 3,895,166 | 7/1975 | Wood | 428/383 |
| 3,897,585 | 7/1975 | Wood | 156/110 A |

*Primary Examiner*—George F. Lesmes
*Assistant Examiner*—Charles E. Lipsey

[57] ABSTRACT

An adhesive system for coating a filamentary substrate, specifically steel wire, to effect the bonding of rubber thereto in preparing vulcanized reinforced structures, especially pneumatic tires, which system consists of a first heat-cured coating of a linear carbon-to-carbon addition polymer having pendent aminimide and c-pyridyl groups and a second heat-cured coating of a RFL composition.

4 Claims, No Drawings

BONDING OF RUBBER TO REINFORCING ELEMENTS

BACKGROUND OF THE INVENTION

1. Field of the Invention

This invention relates to the treatment of a filamentary substrate to improve the bonding properties thereof when utilized as the reinforcing element in the fabrication of vulcanized rubber structures.

2. Description of the Prior Art

In the manufacture of vulcanized rubber goods reinforced with filamentary elements, particularly exemplary of which are pneumatic tires and power transmission belts, the servicability of the resultant structures largely depends upon the strength of the adhesive bond formed between the reinforcing elements and the rubber in the course of the vulcanization step. The problem of adhesion is especially in the forefront in the manufacture of motor vehicle tires since the severe service conditions to which the structures are subjected can result in the development of extremely high temperatures and enormous dynamic stresses therein which in turn are prone to cause separation or delamination of the reinforcing element from the rubber.

The present state of the art with respect to tire cord adhesives irrespective of whether such reinforcer is polyester, nylon or steel is represented by the so-called two-dip system wherein the reinforcing element is given a first coating in the form of a polyoxazolidone resin and then a subsequent coating of a RFL adhesive. In accordance with this prior art, the first adhesive layer is obtained by coating the reinforcing element with an aqueous dispersion of a blocked aromatic diisocyanate and a polyepoxide and thereupon effecting the cure of these reactants in order to secure the indicated resinous structure. The aforementioned system is difficult to fault from the standpoint of the degree of adhesion it promotes. A significant disadvantage of the system, however, resides in the fact that processing problems are encountered in obtaining a uniform coating of the first applied reactive components since it is difficult to maintain a uniform dispersion of the polyisocyanate. Accordingly, there is a need for a like adhesion promoting system but wherein a preformed polymer serving as a polyisocyanate precursor is utilized in the first dip operation.

SUMMARY OF THE INVENTION

In accordance with the present invention, a two-dip adhesive system is provided which is especially adapted for bonding steel wire to rubber in the manufacture of a variety of reinforced vulcanizates. In the first dip an organic solution of a polymer in the form of an addition polymerization product consisting essentially of a vinyl aminimide/4-vinylpyridine copolymer is applied to wire and thereupon heat cured. Following the application of said first coating, the substrate is coated with a conventional RFL composition and heat cured.

In a further embodiment of the invention, an adhesive system for bonding a polyester filamentary element to rubber is provided. In such an embodiment the application of the respective coatings is the same as abovedescribed but wherein the first coating is that of an aqueous solution of an alkylated vinyl aminimide/4-vinylpyridine copolymer and a polyepoxide.

DESCRIPTION OF THE PREFERRED EMBODIMENTS

The vinyl aminimides useful in the practice of this invention are the hydroxy vinyl aminimides, particularly exemplary of which is dimethyl-(2-hydroxypropyl)amine methacrylimide, and the trialkylamine methacrylimides of which trimethylamine methacrylimide represents the preferred monomer. The indicated preferences turn primarily on the economic considerations in that the specified compounds can be most conveniently prepared. Details relative to the manner in which said polymerizable hydroxy aminimides can be obtained are set forth in U.S. Pat. No. 3,485,806. The most commercially applicable method of preparing the trialkylamine methacrylimides is disclosed and claimed in U.S. Pat. No. 3,706,800. Applicable variants of the hydroxy aminimides useful herein are those in which the hydroxyl group is either capped with a diacid anhydride, e.g., succinic anhydride, or reacted with a lower alkylene oxide to provide an alkoxy or polyoxyalkylene group in place of the hydroxy group. In a similar manner the hydroxy vinyl aminimide/4-vinylpyridine copolymer can be capped or alkoxylated.

The copolymerization of the vinyl aminimide with 4-vinylpyridine can be carried out in bulk or in solution. Temperatures as high as about 80° C. can be observed in conducting copolymerization without any significant amount of thermolysis of the aminimide occuring. The copolymerization can be effected by heating alone but is preferably initiated through the use of a conventional radical forming catalyst, e.g., azoisobutyronitrile(AIBN), or alternatively, by radiation. In some instances it is desirable to use the free radical forming catalyst in combination with a reducing agent or promoter.

The ratio of the vinyl aminimide to 4-vinylpyridine can be varied extensively. Generally in preparing the copolymers useful herein, from 80-20 parts by weight of the vinyl aminimide can be copolymerized with correspondingly from 20 to 80 parts of the 4-vinylpyridine. More preferably, the combining ratio of comonomers is from 40 to 60 parts by weight of the vinyl aminimide and correspondingly from 60 to 40 parts of 4-vinylpyridine. In some instances it may be desirable to alter the physical properties of the vinyl aminimide/4-vinylpyridine compolymer by the inclusion of a small amount of other monomers in the copolymerization mixture. For example, the inclusion of about 2 mole percent of diacetone acrylimide in the preferred copolymers serves to enhance the wettability properites of the resultant polymerization product.

The copolymer is applied to the steel wire in the form of a solution thereof in an organic solvent. The preferred solvent is methanol. The solids content of the polymer solution for realizing an optimum degree of polymer deposition is between about 10 and 30% by weight and depends mainly on the viscosity of the polymer solution. The deposited polymer solution coating is then cured at a temperature in the order of 450° F. for approximately a minute and a half.

A second coating of the RFL adhesive is then applied in a similar dip operation. The compositions of RFL adhesives are so well known in the art that they need not be detailed here. An exemplary formulation of this type will be shown in the following working examples which are given to illustrate the invention. All parts and percentages referred to therein are parts by weight unless otherwise indicated.

EXAMPLE I

Two exemplary copolymers useful in the practice of this invention were made in the following manner:

Resin A

Into a suitable reaction vessel equipped with stirrer, thermometer, reflux condenser and gas inlet tube were charged 270 parts by weight dimethyl-(2-hydroxypropyl)amine methacrylimide (DHA), 105 parts of 4-vinylpyridine, 8.45 parts diacetone acrylamide, 384 parts isopropanol, and 8.45 parts azoisobutyronitrile (AIBN). After deaerating the reactor contents by evacution to incipient boiling and flushing with nitrogen, the copolymerization was conducted with stirring for 5 hours at 70° C. The viscous polymer solution was stripped on a rotary evaporator to provide a yellow solid which was ground to a course powder.

Resin B

In a manner similar to that employed in preparing Resin A, 22.4 parts DHA were copolymerized with 8.4 parts of 4-vinylpyridine in 31 parts of isopropanol in the presence of 0.3 part AIBN. After 4 hours of polymerization at 70° C. the resultant copolymer solution was yellow and very viscous. The crude polymer was purified by dissolving with methanol and reprecipitated with acetone. The yield of purified polymer was 50%. The inherent viscosity of the polymer was 0.33 at 0.5 gm. of polymer in 100 ml. of methanol. Gel permeation analysis of the copolymer showed a narrow molecular weight distribution and a weight average chain length of $A_w$=630A.

EXAMPLE II

This example serves primarily to illustrate the effectiveness of Resins A and B for bonding steel wire to rubber in a two-dip operation wherein the wire is coated in the initial dip with the indicated copolymers. The type of wire used for the evaluation was a national standard single strand brass plated (0.16 inch diameter) steel wire. In the first dip, the wire was passed through a 15% solids solution of the copolymer in methanol. In each instance before dipping, the wire was cleaned with perchloroethylene and dried for about 30 minutes at room temperature. Following dipping, the copolymer treated wire was cured at 445° F. for 80 seconds. Next, the polymer coated wire was passed through a standard RFL formulation, details of which are set forth in Table 1 below. Following the second dip as described, the coated wire was then cured under the same conditions as previously noted.

Static adhesion evaluation of the coated wire was thereupon determined in accordance with the standard test (ASTM Method No. 2229-68). A vulcanizable rubber compound of the following recipe was employed in this test.

|  | Parts |
|---|---|
| Natural rubber No. 1 smoked sheet | 35 |
| cis-1,4-polybutadiene rubber | 20.0 |
| SBR rubber | 67.5 |
| FEF carbon black | 55.0 |
| Zinc oxide | 10.0 |
| Stearic Acid | 1.0 |
| Pine tar oil | 7.5 |
| Antioxidant BLE (Naugatuck Chem. Co.) | 0.5 |
| Sulfur | 3.0 |
| Resin Bonding (AROFENE 7209-Ashland Chem. Co.) | 1.67 |
| Benzothiazol disulfide | 1.2 |
| DPG (diphenylguanidine) | 0.2 |

The adhesive values noted for their respective test runs together with the composition of the RFL dip solution was outlined in the following Table I. The average adhesion value specified was determined from eight separate samples of the coated wire.

TABLE I

| Run No. | 1st dip composition* (polyaminimide-4-VP) | 2nd dip composition | | | | | Avg. Adhesion Value, lbs. |
|---|---|---|---|---|---|---|---|
|  |  | RF[1] | HCHO | Latex[2] | NaOH | Water |  |
| 1 | Resin A* | 9.56 | 4.08 | 52.41 | 2.14 | 31.8 | 44.8 |
| 2 | Resin B* | 9.56 | 4.08 | 52.41 | 2.14 | 31.8 | 46 |

*15% Resin - 85% methanol
[1]Resorcinol/HCHO fusible resin (Arofene 779-Ashland Chem. Co.)
[2]Gentac vinylpyridine latex (The General Tire and Rubber Co.)

EXAMPLE II

The copolymers of this invention are amenable for use as an adhesive component for polyester type filamentary elements. In coating such substrates an aqueous system is employed for applying the first coating which leads to the in situ formation of a polyoxazolidone resinous structure, all as referred to in the description of the prior art given hereinbefore. The vinyl aminimide/ 4-vinylpyridine copolymers of this invention can be rendered water soluble through the alkylation or quaternization of the pendent c-pyridyl groups. A variety of quaternizing agents can be used for this purpose, representative of which are methyl chloride, methylchloracetate, 3-chloropropene and 1, 2, 3-chloropropene. Quaternization can be readily carried out by reacting the copolymers and an excess of the quaternizing agent in methanol at a temperature of about 60° C. After alkylation has run its course, excess quaternizing agent can be removed by stripping and then the polymer dissolved in water along with a water soluble polyepoxide.

In the evaluation of a plurality of quaternized copolymers as an adhesive for polyester cord the standard two-dip procedure was utilized in which the respective dips corresponded to the following formulations:

| Dip 1: | Copolymer (quaternized) | 4.9% |
|---|---|---|
|  | Epon 812 (Shell Chemical Co.) | 2.45% |
|  | Surfactant | 0.14% |
|  | Water | 92.51% |
| Dip 2: | Arofene 779 (Ashland Chem. Co.) | 2.94% |
|  | Formalin | 1.95% |
|  | Gen-Tac (General Tire & Rubber Co.) | 41.71% |

-continued

| Water (NaOH, MH₄OH to pH 10.5) | 53.4% |

In testing static adhesion in accordance with this example each of the dipping operations consist of three steps, specifically that of (1) pretensing for the dip bath, (2) curing with a hot stretch in a horizontal heat chamber and (3) cord take up. A standard commercial grade of polyester tire cord was used in this example and following each dip the curing cycle 45 seconds at 445° F. was observed. The compositions of the quaternized copolymers together with the average "H" adhesion values obtained for the individual runs are outlined in the following Table II.

TABLE II

| Run No. | Copolymer Composition[a] | Alkylating Agent | % Quat. with Respect to 4VP | "H" Adhesion[d] lbs. | Rubber Coverage |
|---|---|---|---|---|---|
| 1 | 40 | $CH_2ClCO_2CH_3$ | 66 | 36.4[b] | 90 |
| 2 | 60 | $CH_2ClCO_2CH_3$ | 89 | 38.0[c] | 100 |
| 3 | 60 | $CH_2ClCO_2CH_3$ | 36 | 40.0[c] | 100 |
| 4 | 60 | $CH_2Cl-CH=CH_2$ | 70 | 30.0[b] | 100 |
| 5 | 20 | $CH_2Cl-CH=CH_2$ | 90 | 31.2[b] | 100 |
| 6 | 60 | $CH_2Cl-CCl=CHCl$ |  | 34.2[b] | 100 |

[a] Molar concentrations $(M_{DHA}/M_{DHA} + M_{4VP}) \cdot 100$ of monomer in the copolymer
[b] Tested on PE cord F1 T-785-1000/3
[c] Tested on PE cord DuPont T-68-1300/3
[d] ASTM D2229-68

What is claimed is:

1. A rubber-reinforcing element in the form of a filamentary substrate of steel having a heat-cured first coating of an addition polymerization product consisting essentially of a copolymer of 4-vinylpyridine and an aminimide selected from the group consisting of dimethyl-(2-hydroxypropyl)amine methacrylimide and trimethyl amine methacrylimide, and a heat-cured second coating of a RFL adhesive.

2. A rubber-reinforcing element in accordance with claim 1 wherein said heat-cured first coating is that of a copolymer of from 20–80 parts by weight of 4-vinylpyridine and correspondingly from 80–20 parts of an aminimide selected from the group consisting of dimethyl-(2-hydroxypropyl)amine methacrylimide and trimethyl amine methacrylimide.

3. A rubber-reinforcing element in accordance with claim 2 wherein said aminimide is dimethyl-(2-hydroxypropyl)amine methacrylimide.

4. A reinforced rubber structure wherein the reinforcing element is a coated substrate in accordance with claim 3.

* * * * *